United States Patent Office 3,278,329
Patented Oct. 11, 1966

3,278,329
SUSPENSION COATING OF FILAMENTS
Sol B. Wiczer, 1815 H St. NW., Washington, D.C.
No Drawing. Filed Dec. 6, 1961, Ser. No. 157,591
4 Claims. (Cl. 117—62)

This invention is a continuation-in-part of my copending applications, Serial Number 353,003, filed May 4, 1953, now Patent Number 2,862,684, issued December 2, 1958; Serial Number 777,344, filed December 1, 1958, now abandoned.

This invention relates to fiber modified by a coating upon the fiber to produce therein surface irregularity by coating the fiber with a plastic substance containing a gas-forming agent, and then treating the coated filament to activate the gas-forming agent to impart an irregular bubbly character to the surface of the filament to impart improved surface characteristics before spinning into a yarn or weaving into a fabric; or the coated filament before or after coating may be chopped into short lengths and then confined in a mold and treated to activate the gas-forming agent in the surface coating to form a porous molded product having a filamentaceous filler; and to the methods of forming these products.

According to the present invention, the synthetic plastic filament is coated with a composition having incorporated therein a gas-forming agent to acquire after generation of the gas a foamy texture, and most desirably, for purposes hereof, a texture wherein the surface has a series of pores formed by the expansion of gases therefrom during a stage of formation wherein plastic coating material is sufficiently pliable to be slightly deformed by expansion of the gas, but sufficiently set in the filament form to avoid destruction of its filamentary character. As this invention is preferably practiced, an agent, herein, called a blowing agent, comprising an unstable compound capable of developing a gas by decomposition, as by application of heat or by reaction with subsequently applied reagent, is associated with plastic material after being formed into filament and coated to impart thereto by expansion of the gas the desired porous surface characteristics hereof.

In another aspect of this invention, a relatively heat stable fine filament core of natural or synthetic fiber is formed with a thermoplastic coating composition containing a blowing agent or a gas-evolving substance capable upon heating and expanding only the heated and softened coating composition to a porous form without affecting the filamentaceous core upon which it is coated. The thermoplastic coated filament may have the blowing agent incorporated at any of several stages of its production. The coated filament core, usually available in continuous lengths, may be coated with a thermoplastic film-forming substance, for example polystyrene dissolved in a solvent which can contain a blowing agent, or the gas-evolving properties can be imparted to the filament after coating with the thermoplastic film. The coated continuous filament lengths containing blowing or gas-evolving agents are then chopped into short lengths ranging approximately from about ⅛" to ¾".

In still another alternate procedure, the filament core may first be chopped into such short lengths and then coated with the thermoplastic coating composition either containing the blowing agent using a sufficient heat or a solvent to fluidize the coating for application to the filament core but insufficient to activate the blowing agent, or the thermoplastic coated short lengths of filament can have the blowing agent or gas-forming properties imparted in a subsequent treatment stage after the filaments have been coated.

In still another alternate form, the chopped short filament lengths can be dipped in a liquid monomer or solution of preformed polymer in monomer, and the polymerization of the monomer may then be completed in situ as a coating upon the filament. For instance, in a perferred procedure, the monomer coated short filament lengths may be suspended by agitation in a water bath and dispersed as individual filament together with catalyst and suspending agents until the polymerization is completed as a thermoplastic coating upon each individual filament core material. The chopped short thermoplastic polymer coated filament lengths may finally be treated to impart blowing or gas-forming characteristics thereto; or alternately, the monomer or monomer solution may have dissolved or suspended therein a blowing agent which will not affect the polymerization of the monomer and will remain inactive while the monomer is being polymerized in situ upon the filament core materials coated therewith. Thus despite the application of necessary heating of the agitated suspension in water at a temperature to complete the polymerization as a coating upon each filament, the temperature is inadequate to activate the blowing agent. Whichever procedure is followed, short chopped lengths of thermally stable filament core having a coating of thermoplastic polymer substance containing a blowing agent is produced as fine free-flowing filamentaceous particles containing a blowing agent. In use such thermoplastic expandible filament particles are loaded to partially fill a mold, and the closed mold is then heated sufficiently to activate the gas release to cause expansion of the thermoplastic coating by simultaneous heat softening and release of the gas from the blowing agent with the heat, the expansion of each coating film upon the filaments fills the mold and shapes the product according to the form of the mold developing sufficient pressure and softening of the thermoplastic to cause cohesion to a monolithic molded product. Such product, while having the light porosity of an expanded plastic molding, has the great strength of well distributed and well bonded filamentaceous filler throughout the product.

The specific handling procedure for developing the gas and consequent surface porosity in the filament will vary slightly with organic plastic materials from which the filament is formed depending upon specific physical and chemical characteristics of the plastic material.

Where the filament is a thermoplastic material it may be linear superpolyamide such as nylon, linear polyester such as polyethylene terephthalate, polyacrylonitrile, styrene or polymerized solutions of polymer in a monomer of such substances, or other thermoplastic materials, or it may be of inorganic plastic such as silicone polymer or even glass, capable of extrusion into filaments by fluidizing the plastic with heat and setting the filament by cooling. The gas blowing agent may be suspended in the same or a different plastic coating composition and coated upon the filament and thereafter the filament is given a heat treatment sufficient to decompose the blowing agent in the coating without destroying the filamentaceous character of the filament. In such process the blowing agent, such as an azo compound, will be selected to decompose at a temperature below that at which the plastic is substantially molten, i.e. at a temperature wherein the plastic is merely soft.

In another alternative procedure, particularly useful where the plastic material is chemically set by chemical reaction with the bath such as in cellulose base plastics such as viscose, cellulose xanthate and cellulose esters, the spinning solution comprising the cellulose plastic has incorporated a gas-forming agent and the gas is developed by chemical reaction with the bath. For this purpose, a cellulose solution such as alkali cellulose has incorporated a gas-forming salt like sodium carbonate, and the cellulose solution is then coated upon the filament which is then passed into an aqueous acid bath which serves the dual purpose of both regenerating the cellulose and causing the gas to be formed by reaction with the sodium carbonate to evolve carbon dioxide and produce a bubbled surface texture.

In still another procedure where the filament is set by a chemical coagulation bath, as usually used for cellulose filaments, the coated filament, such as coated glass fiber, while still swollen and gelatinous prior to drying, may have the gas-forming agent dusted thereon which may be either acid reactive, i.e. reactive with the acid solution clinging to the swollen filament from the coagulating bath, such as by dusting sodium carbonate on the acid wet cellulose coated filament, or, since cellulose filaments are thermally stable at substantially raised temperatures, the blowing agent dusted upon the swollen coated filament may be such as is activated by heat, and may be dusted upon the wet swollen filament to adhere directly thereto. The filament thereafter, as coated with the dusted blowing agent, may be passed through a heated tube to raise the temperature sufficient to cause evolution of gas from the blowing agent and simultaneously to dry the same.

As a slight modification of the last procedure, useful where the filament is formed of thermoplastic material, the thermoplastic filament may be passed through a bath containing an organic liquid such as a plasticizer liquid or a liquid which is more volatile, where a residual plasticizer coating is not desirable, and which liquid has the effect merely to swell and soften the surface of the filament. Simultaneously the plasticizer or swelling liquid may contain the blowing agent dissolved or dispersed therein and thereby serves not only to swell the filament but to impregnate the same with blowing agent. Thereafter, the swollen thermoplastic filament is heated sufficient to evaporate the solvent and develop the gas from the blowing agent but insufficient to melt the filament and destroy its thermoplastic character. For example, a thermoplastic filament such as linear polyamide, polyester, or polyacrylonitrile, etc., is first extruded through a spinneret and is then passed through a bath comprising a solution of dimethyl formamide and water having dissolved therein 3% of a blowing agent. The blowing agent may be heat activatable at a temperature below the fusing point of the filament material. Or the blowing agent may be activatable by acid such as sodium carbonate. The filament thus coated is dried and may be passed through a hot tube at a temperature merely high enough to activate the blowing agent without melting the filament material. Alternatively, the coated filament, if coated with sodium carbonate, may be passed through a dilute aqueous bath of hydrochloric acid.

The bath material may contain a film-forming binder substance which serves to bind the blowing agent to the surface of the filament in a thin film coated thereover. Thus, for example, an extruded nylon or other thermoplastic filament may be passed through a bath containing a dilute solution of viscose, cellulose xanthate, etc., which further contains dissolved therein sodium carbonate. The filament is then dried with warm air and then passed through a bath which contains acid coagulating agents which serve both to regenerate the cellulose in the film and activate the sodium carbonate to develop gas bubbles in the surface.

In a further modification a heat stable core material as filament, such as relatively heat stable cellulosic filament; for example, cotton, rayon or acetate fiber, other heat stable filaments such as silk, wool, glass, silicone, Orlon, Dacron or nylon fiber or the like is continuously dipped in a solution of styrene monomer containing rubber, and the wet coated filament is heated by passing continuous lengths through a hot tube until the polymerization is completed. The styrene monomer may contain an oxidizing catalyst as benzoyl peroxide to accelerate the polymerization. Thereafter, the filament coated with polystyrene is heated with a petroleum solvent such as petroleum ether having 4 to 7 carbon atoms boiling in the range of about 30 to 80° C. or other easily gasified solvent or softening agent such as methylene chloride, methyl chloride, acetone or the like, which swells and softens the thermoplastic polystyrene coating upon the fiber without dissolving it. Thereafter, the fiber which may then be first precut into short lengths before treatment with the swelling agent or may be cut into short fiber lengths, and after having been treated with the swelling agent, is used as a filamentaceous molding powder as described.

In a further alternate procedure, short lengths of a fiber core material which are relatively thermally stable at temperatures below a practical range of 120 to 200° C., are chopped into short lengths coated with liquid polymerizable monomer such as styrene, acrylonitrile, methyl methacrylate, vinyl chloride, vinylidenechloride, vinyl acetate, butadiene, 2-chlorobutadiene, dicyclopentadiene and the like, which monomer may contain a polymer dissolved therein, such as GRS rubber, butyl rubber, neoprene and the like, in quantity up to about 30 to 40%. Such monomers and solutions of preformed rubbers therein upon polymerization form coatings such as polystyrene, polyurethane, polyacrylonitrile, polybutadiene, polycyclopentadiene, poly 2-chlorobutadiene copolymers of styrene and butadiene and polymerized solutions of copolymers of butadiene and styrene, polybutadiene, polycyclopentadiene, polyvinyl chloride, polyvinylidene chloride and copolymers of polyvinyl chloride-polyvinyl acetate copolymer in a monomer of said polymers. Other monomers or liquid mixtures capable of polymerizing such as diisocyanate-phthalic anhydride or maleic anhydride, epoxy mixtures such as 2,2-diphenylol propane and epichlorohydrin or hydroxy acetone and formaldehyde and the like, may be coated upon the fiber and then polymerized thereon.

The monomer may further contain a small quantity of a wetting agent such as sodium dodecyl benzene sulfonate or equivalent wetting agent in quantity of about 0.001% to about 0.1% by weight of water insoluble monomer and the wet coated fibers in short chopped lengths can be suspended with agitation in water containing a suspending agent, such as fine particles of calcium phosphate, polyvinyl alcohol or the like, and the suspension can then be heated with agitation until the polymerization is completed as a coating in situ upon the fiber core.

Thereafter, the coated short fiber lengths are treated with gas-evolving agent such as a vaporizable solvent such as butane, pentane, hexane, or petroleum ether mixture until the coating swells. After superficial drying to remove surface solvent, the coated, empirically dry fibers are packaged for subsequent use.

Thereafter, in use, upon partially filling a mold and heating to a thermo softening temperature the occluded propane in the coating puffs up the softened coating softened sufficient to allow release of the pentane, and foaming of the coating into a porous tacky mass results. As confined in a mold, the fibrous product fills the mold and integrally fuses to a monolithic molded mass. This produces a very strong molded mass in which the short fibrous core materials remain as a strong reenforcing filler substance intimately adhered to the porous thermoplastic coating thereon. Moreover, as the mold is filled and the softened foamed plastic is reenforced with the numerous well distributed short fiber lengths, there is no substantial tendency of the mass to collapse or shrink after the heating is discontinued.

The quantity of gas blowing agent contained in a filament coating composition is usually held to less than about 3% as a maximum, variable slightly with the quantity of gas that may be evolved by the particular chemical, but the quantity of such is usually held to between .5% and 1.5% of the weight of thermoplastic type plastic with which it is incorporated.

Suitable blowing agents for use herein where they are organic are usually diazo compounds and many are known in the art as gas developers activatable for this purpose over a wide range of temperatures and accordingly one is readily selected to evolve gas at the desired temperature. Typical examples are:

Phenylazo ethyl sulfone
Phenylazo isopropyl sulfone
Phenylazo n-butyl sulfone
p-Xenylazo ethyl sulfone
p-Chlorophenylazo-ethyl sulfone
p-Chlorophenylazo-methyl sulfone
p-Tolylazo-methyl sulfone
Phenylazo-methyl sulfone
2,5-dichlorophenylazo-methyl sulfone
Phenylazo p-tolyl sulfone
p-Tolylazo phenyl sulfone
p-Chlorophenylazo-p-tolyl sulfone
p-Chlorophenylazo phenyl sulfone
p-Chlorophenylazo-p-chlorophenyl sulfone
2,5-dichlorophenylazo-phenyl sulfone
Phenylazo-p-chlorophenyl sulfone
p-Tolylazo-p-chlorophenyl sulfone
p-Tolylazo-p-tolyl sulfone
Biphenylazo-p-tolyl sulfone
Diphenyl bis(azophenyl sulfone)-4,4'
Di-p-tolyl bis(azophenyl sulfone)-4,4'

These blowing agents decompose to evolve gas when heated to a temperature in the range of 80° to 200° C. For example, parachloro phenyl azo methyl sulfone would evolve gas when heated to 115 to 118° C. Other types of azo compounds are useful, for example, diazo amino benzene, alpha,alpha-azo-bis-isobutyrontrile, various triazenes such as 1,3-bis(O-xenyl)-triazene which develop gas when heated at 130–135° C. and various members of this group decompose to develop gas at temperatures variable over the range of 115–140° C. For the chemical reactive type of gas-evolving agent in addition to the sodium carbonate mentioned above, other inorganic carbonates may be used.

The organic type blowing agent is generally soluble in the organic plastic and the sodium carbonate would be soluble in the aqueous medium of the alkaline ripened cellulose or xanthate thereof, but the blowing agent may be incorporated as a dry insoluble powder in the plastic provided that it is sufficiently finely divided to pass through the spinneret openings and for this purpose would be reduced to a particle size of extreme fineness of about the order of 1 or 2 microns or less. The following examples illustrate the practice of this invention:

*Example I*

Polyethylene terephthalate having a molecular weight of about 65,000 is melt extruded to a filament, cooled in air to normal room temperature and then passed through a bath containing a viscose solution as described in Example 5 comprising originally about 6.5% of sodium hydroxide and 8% of cellulose, 4% of sodium carbonate and 1% of sodium lauryl sulfate as a wetting agent. The extruded filament is passed through this bath to pick up a coating of viscose thereover and then led into a second bath comprising the coagulating bath of Example 5. The filament is found to have a fine porous coating of regenerated cellulose.

*Example II*

Polyethlene terephthalate after melt extrusion into filament, and cooled to set the filament at ambient room temperature, is heated by passing the filament through a tube maintained at a temperature of 150° C. The filament is then passed through a pair of cold polished stainless steel tangential rollers on which powdered parachlorophenyl azomethyl sulfone was added by dusting on the rollers and the powder pressed by the tangential roll into the surface of the soft filament while cooling the same. The filament is again reheated to a temperature of 150° C. to decompose the gas evolving azo compound impregnated in the surface thereof. Thereafter the filament may be stretched, crimped, treated with plasticizing fluids, etc. as desired and the filament will be found under microscopic examination to have a series of pockmarks and surface pores caused by the decomposition of the powdered blowing agent adhered thereto.

*Example III*

Continuous filaments of fiber glass are passed through a 20 weight percent solution of polyacrylonitrile of about 60,000 M.W. in dimethylformamide having 2% of diazoaminobenzene added thereto. The filaments after coating are dried in warm air at 110° C. and then passed continuously through a heated tube at 160° C. to decompose the blowing agent and form a bubbly surface. Multifilament yarns spun of these filaments have the usual strength in tension of fiber glass, but have considerably increased strength in shear as well as much enhanced insulating value, low heat transfer, as compared to untreated glass fiber thread and fabric woven therefrom.

In a slight modification of this example, after the coated filament is dried in warm air, it is cut into short lengths ranging from ⅛ to ¾", generally averaging about ¼", and packaged as such for subsequent use. In use, the coated glass filament is loaded into a mold, partially filling the same. After the mold is closed, it is heated to about 200° C., thereby decomposing the blowing agent and softening the coating until it is tacky. The coatings upon the filament expand, causing the entire mold to be filled with a well distributed mixture of short filaments, and the expanded coatings cohere into a monolithic molded body of high porosity and great strength, well reenforced by the fiber. A molding such as ½" thick flooring placque may be formed which is highly resilient but has very good wearing strength.

In a further modified procedure, the mold, as described in the preceding paragraph, can be formed by placing a closure such as an inverted rectangular form upon a flat surface, such as an intermediate flooring base of cement or wood, which may have been coated with mastic. The mold is partly filled as before with evenly distributed coated glass fiber and the mold assembled upon the floor is heated to form the rectangular floor placque so that, upon cooling, the molded plate upon the floor is an expanded porous tile placque having substantial resiliency, even as formed in situ as flooring upon the floor. In this manner, a complete flooring may be applied placque by placque to mold flooring in situ, the flooring having great strength and substantial resiliency.

*Example IV*

Polyhexamethylene adipamide has incorporated therein approximately 1% of sodium carbonate as fine powder milled to an average particle size of about 1 micron. It is melted and extruded through a spinneret and hardened as a multi-filament batch in air and then passed through a tube through which is led wet steam at 100° C. containing 5% of hydrochloric acid gas, then led through a neutralizing bath containing .5% of sodium carbonate at a pH of about 8 and finally through a cold water washing bath and finally through a warm air drying tube. The filament is found to be surface porous dotted with tiny depressions.

*Example V*

A viscose coating solution containing about 6.5% of sodium hydroxide and 8% cellulose prepared in the conventional manner is made after ripening to an index of about 4 (sodium chloride) with 1% of sodium carbonate homogeneously dissolved therein. Glass fiber is continuously passed through this voscose solution and the wet coated glass filaments are then passed directly into a bath containing about 12% of sulfuric acid, 22% sodium sulfate, 1.5% of zinc sulfate and a trace of a wetting agent. Thereafter the filaments are dried to produce a porous surfaced strong fiber as in Example 4.

*Example VI*

In an alternate procedure, polyacrylonitrile of molecular weight of about 60,000 after soaking in water and damp pressing is mixed with 3% of parachlorophenyl azo-phenyl sulfone in the form of fine powdered particles and then extruded as a filament under a pressure of about 2,000 p.s.i. and a temperature of 140° C. from a 35 mm. spinneret. It is then cooled to room temperature in air and passed through the viscose bath having the composition as described in Example 5 to which no additional blowing agent was added. Thereafter, the viscose coated filament was passed through a coagulating bath as described in Example 5. Finally the filament was heated to 175° C. by passing through a heated tube. The filament was found to be porous throughout and substantially expanded.

As thus described, filaments are produced which have a porous texture. In this instance of using glass fiber as the core material, the filament is of great strength. The desirable characteristics are further imparted by the surface coating which alone may be porous. That surface material of organic plastic may also impart substantial strength to the fiber as illustrated in the following example.

*Example VII*

Glass fiber is passed as continuous filament through a 20 weight percent solution of poly phenol siloxane having a molecular weight of about 40,000 dissolved in n-heptane and further containing 1.5% of phenyl azo-methylsulfone, dried in air at 100° C. and immediately passed through a heated tube at a temperature of 260° C. to develop surface pores.

In a slight modification of this example, the coated fiber after drying is chopped into short lengths ranging from about ⅛ to ¾", and usually packaged for subsequent use. When used, it is placed in a mold, only partially filling the mold, and the closed mold is then heated to cause expansion of the silicone coating by activation of the blowing agent at a temperature of about 260° C. That temperature also softens the residual silicone coating making it tacky and bringing it by expansion into contact with expanded surfaces of several other neighboring filaments which are all caused to cohere by contact of the softened silicone into a monolithic molding, which upon cooling of the mold fully retains its shape, porosity, and substantial strength.

Thus a filament surface is modified to impart tiny pores or semicircular holes comprising a surface irregularity. Yarns or bats formed from such filament tend to occlude greater quantities of gases and thereby have a high insulating effect. They are, moreover, more amenable to felting.

*Example VIII*

Glass fibers are chopped into short lengths and are wet with monomeric styrene, centrifuged or drained to remove excess liquid styrene, and are then placed in a continuously agitated water bath of about equal quantities; that is, 100 parts of water to about 100 parts by weight of wet coated fiber. Before coating, the styrene had added to the bath 100 parts of styrene monomer, 0.05 part of dodecyl mercaptan modifier, 0.2 part of antioxidant and 0.08 part of benzoyl peroxide. The water bath has added thereto per 100 parts, 0.6 part of trisodium phosphate, 0.78 part of calcium chloride, 3.0 parts of polyvinyl alcohol, 0.0036 part of lecithin and 0.12 part of anionic emulsifying agent comprising dodecylbenzene sodium sulfonate. The suspension is stirred with heating for a period of about 6 hours, the temperature rise amounting to about 100° C. and maintained until the styrene has polymerized to a hard coating. Thereafter, the coated fiber is removed from the bath, washed, centrifuged to remove water and dried in air. The coated fiber is then dipped in petroleum ether boiling from 40 to 60° C. until it is swollen. It is then placed in a mold, partially filling the same, and the closed mold is heated to cause expansion of the styrene coating which swells to form a foam and each coated fiber coheres to the others forming a monolithic product of the shape of the mold, as an integrally strong monolithic form, while being light and highly porous.

Following the procedure of this example, the fibrous base substance may be varied by substituting for the glass fiber such other fibrous bodies as wool, cotton, or glass, or some synthetics which are comparatively insoluble and heat stable at temperature above about 100° C. such as cellulose esters and ethers, for instance cellulose acetate fiber, polyacrylonitrile fiber such as Orlon, polyterephthalic ethylene glycol condensate and mixed acrylic fibers such as Dynel or Chemstrand, polyamid fibers such as nylon or other fibers.

*Example IX*

Chopped cotton fiber lengths are wet with monomeric styrene having dissolved therein 25% of GRS rubber. The coated fiber is treated exactly as in Example 8 to set the coating to a high impact polymer coating on the fiber. It is then treated to impart gas-forming agent by soaking in petroleum ether, the coated fiber being ultimately expanded in a mold to form a high impact strength highly porous molding greatly reinforced by the integrally coated and cast fibrous core material content.

*Example X*

Continuous lengths of glass filament are run through a molten bath comprising 95 parts of polystyrene, 3 parts of methyl chloride and 2 parts of tetrachloro ethane. The coated glass fiber is cooled and then chopped into short lengths. The chopped fiber is then soaked in a partial solvent such as acetone until it is substantially swollen. It is then partially dried in a vacuum and packaged for subsequent ready use. The empirically dried packaged fiber is used by partially filling a mold and then heating to cause the solvent acetone to expand so that each coating coheres to the next, filling the mold by expanded coatings bonded to fiber core to form a strong monolithic molded mass of high strength and porosity. The molded product is found to be fire retardent and will not support combustion. Various swelling agents may be substituted for the acetone; for instance, methylene chloride, methyl chloride, n-pentane, n-butane, isobutane, isopentane, neopentane and the like.

I claim:

1. A process of forming short filaments expandable into a strong coherent molded foamed body comprising coating short lengths of water insoluble heat stable filaments with a water insoluble liquid monomer polymerizable into a thermoplastic film, suspending the wet monomer coated filaments in water and agitating with heat to effect polymerization of the coating upon individual filaments in suspension, removing the thermoplastic polymer coated short lengths of filaments from the water suspension and impregnating the thermoplastic coating with a gas-forming agent adapted by heating of said thermoplastic coating to its tacky softening point to be converted to fine gaseous bubbles in the coating, thereby expanding the softened coating to a coherent foam.

2. The process of coating fiber with polymer comprising wetting the fiber with a water insoluble polymerizable monomer liquid, suspending the said monomer-coated fiber in water containing suspending agents and agitating with heat for a period sufficient to effect polymerization of the coating upon the individual fibers, removing the polymerized coated fibers from the water suspension and drying the coated fiber product.

3. The method as defined in claim 2 wherein the fiber core comprises short lengths of fiber glass.

4. The method as defined in claim 2 wherein the polymerizable monomer liquid is selected from the group consisting of styrene, acrylonitrile, methyl methacrylate, vinyl chloride, vinylidene chloride, butadiene, 2-chlorobutadiene, dicyclo-pentadiene and solutions of styrene monomer having rubber polymer dissolved therein.

References Cited by the Examiner

UNITED STATES PATENTS

| | | | |
|---|---|---|---|
| 1,829,906 | 11/1931 | Lilienfeld | 117—166 X |
| 2,125,827 | 8/1938 | Turkington | 117—119.8 |
| 2,207,158 | 11/1940 | Neville et al. | |
| 2,407,582 | 9/1946 | Soday | 117—140 |
| 2,460,976 | 8/1949 | Church | 260—8 |
| 2,518,454 | 8/1950 | Elliott | 260—2.5 X |
| 2,576,073 | 11/1951 | Kropa et al. | 260—2.5 X |
| 2,673,825 | 3/1954 | Biefeld et al. | 117—135.5 |
| 2,677,713 | 5/1954 | Weil et al. | 260—2.5 X |
| 2,730,455 | 1/1956 | Swann | 117—4 |
| 2,862,284 | 12/1958 | Wiczer | 260—2.5 X |
| 2,877,501 | 3/1959 | Bradt | 117—4 X |
| 2,879,197 | 3/1959 | Muskat et al. | 264—43 |
| 2,972,593 | 2/1961 | Daly | 260—41.5 |

WILLIAM D. MARTIN, *Primary Examiner.*

R. HUSACK, *Examiner.*